US012606193B2

(12) United States Patent
Beaurepaire et al.

(10) Patent No.: US 12,606,193 B2
(45) Date of Patent: Apr. 21, 2026

(54) METHOD FOR DETERMINING AN OPTIMAL LOCATION TO WAIT FOR A LEFT TURN TO MINIMIZE TRAFFIC IMPACT

(71) Applicant: HERE GLOBAL B.V., Eindhoven (NL)

(72) Inventors: Jerome Beaurepaire, Courbevoie (FR); Leon Stenneth, Chicago, IL (US); Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 266 days.

(21) Appl. No.: 18/081,330

(22) Filed: Dec. 14, 2022

(65) Prior Publication Data

US 2024/0199060 A1      Jun. 20, 2024

(51) Int. Cl.
*B60W 50/16*        (2020.01)
*B60W 30/095*       (2012.01)
        (Continued)

(52) U.S. Cl.
CPC ........ *B60W 50/16* (2013.01); *B60W 30/0956* (2013.01); *B60W 30/18159* (2020.02); (Continued)

(58) Field of Classification Search
CPC ........... B60W 50/16; B60W 30/18159; B60W 30/0956; B60W 40/08; B60W 40/02; (Continued)

(56) References Cited

U.S. PATENT DOCUMENTS 9,751,506 B2      9/2017  Mudalige et al.
10,576,984 B2     3/2020  Kanzawa
        (Continued)

FOREIGN PATENT DOCUMENTS

CN          108389400 A     8/2018
WO      WO2022059352 A1     3/2022

OTHER PUBLICATIONS

Wang, et al., "Trajectory Prediction for Left-Turn Vehicles at T-Shaped Intersections Based on Location Based Service," Tongji University Shanghai, The 3rd International Conference on Transportation Information and Safety, Jun. 25-28, 2015, DOI: 10.1109/ICTIS.2015.7232074, pp. 29-33.

*Primary Examiner* — Kam Wan Ma
(74) *Attorney, Agent, or Firm* — Michael Yu; HERE GLOBAL B.V.

(57) ABSTRACT

A system, a method and a computer program product are provided to determine a left turn decision for a user or autonomous vehicle attempting to turn at an intersection of a road. For example, the system obtains contextual features and/or sensor data related to the intersection of the road. An optimal location on the road is determined for the user or autonomous vehicle to position the vehicle to make the left turn decision, based on the contextual features and/or the sensor data. A left turn risk factor is determined based on the location on the road for the user or autonomous vehicle to position the vehicle to make a left turn. An alert is presented to the user or autonomous vehicle regarding the left turn risk factor with a left turn advisory message.

16 Claims, 5 Drawing Sheets

(51) Int. Cl.

| | |
|---|---|
| *B60W 30/18* | (2012.01) |
| *B60W 40/02* | (2006.01) |
| *B60W 40/08* | (2012.01) |
| *B60W 50/14* | (2020.01) |
| *G06N 20/00* | (2019.01) |

(52) U.S. Cl.
CPC ............ *B60W 40/02* (2013.01); *B60W 40/08* (2013.01); *G06N 20/00* (2019.01); *B60W 2050/143* (2013.01); *B60W 2050/146* (2013.01); *B60W 2552/53* (2020.02); *B60W 2554/80* (2020.02); *B60W 2555/20* (2020.02); *B60W 2556/10* (2020.02); *B60W 2556/40* (2020.02); *B60W 2556/50* (2020.02)

(58) Field of Classification Search
CPC ......... B60W 2556/10; B60W 2556/50; B60W 2552/53; B60W 2556/40; B60W 2555/20; B60W 2554/80; B60W 2050/143; B60W 2050/146; G06N 20/00
USPC .......................................................... 340/435
See application file for complete search history.

(56) References Cited

U.S. PATENT DOCUMENTS

| | | | | |
|---|---|---|---|---|
| 10,928,820 | B1 * | 2/2021 | Tao ................. | B60W 60/00274 |
| 2007/0050133 | A1 * | 3/2007 | Yoshikawa ........ | G01C 21/3461 |
| | | | | 701/437 |
| 2017/0113665 | A1 * | 4/2017 | Mudalige ............... | G08G 1/163 |
| 2018/0281803 | A1 * | 10/2018 | Mukai .................... | G08G 1/056 |
| 2021/0094548 | A1 * | 4/2021 | Komoguchi .... | B60W 30/18154 |
| 2023/0120172 | A1 * | 4/2023 | Yoshimatsu ...... | B60W 30/0953 |
| | | | | 701/301 |

* cited by examiner

400

402

OBTAIN CONTEXTUAL INFORMATION AND/OR
SENSOR DATA FOR INTERSECTION

404

DETERMINE LOCATION ON THE ROAD FOR USER TO
POSITION THE VEHICLE TO MAKE LEFT TURN
DECISION

406

DETERMINE A LEFT TURN RISK FACTOR BASED ON
LOCATION ON THE ROAD

408

ALERT THE USER TO THE LEFT TURN RISK FACTOR
WITH A LEFT TURN ADVISORY MESSAGE

METHOD FOR DETERMINING AN OPTIMAL LOCATION TO WAIT FOR A LEFT TURN TO MINIMIZE TRAFFIC IMPACT

TECHNOLOGICAL FIELD

An example aspect of the present disclosure generally relates to determining a turning decision at a road intersection, and more particularly, but without limitation relates to a system, a method, and a computer program product for determining a vehicle position and turn risk factor when making a left turn at an intersection.

BACKGROUND

Driving a motor vehicle or riding in an autonomous vehicle presents challenges in navigating streets and particularly when making turns, especially left turns. In some intersections, when turning left, drivers not only have to pay attention to the incoming traffic but also to the spacing around the driver's vehicle in relation to street and intersection dimensions, vehicle size, comfort level of the driver and other factors present. In some types of intersections where left turns are possible, it is not obvious where the safest place is to wait until turning. In these types of intersections, the driver knows that cars behind will attempt to go around if some space is available, but often the risk comes from the fact that this space might be sufficient for some vehicles but not for all. A bad estimation of this available space can cause an accident.

BRIEF SUMMARY

In an aspect of the disclosure, a system to determine a left turn decision for a user driving a vehicle attempting to turn at an intersection of a road is disclosed. The system includes at least one memory configured to store computer executable instructions; and at least one processor configured to execute the computer executable instructions to: obtain a plurality of contextual features and/or a plurality of sensor data related to the intersection of the road; determine a location on the road for the user to position the vehicle to make the left turn decision, based on the plurality of contextual features and/or a the plurality of sensor data; determine a left turn risk factor based on the location on the road for the user to position the vehicle; and alert the user to the left turn risk factor with a left turn advisory message.

In an aspect of the disclosure, a method to determine a left turn decision for a user driving a vehicle attempting to turn at an intersection of a road is disclosed. The method includes obtaining a plurality of contextual features and/or a plurality of sensor data related to the intersection of the road; determining a location on the road for the vehicle to position the to make the left turn decision, based on the plurality of contextual features and/or a the plurality of sensor data; determining a left turn risk factor based on the location on the road for the vehicle to position; and alerting the vehicle to the left turn risk factor with a left turn advisory message.

In an aspect of the disclosure, a computer program product comprising a non-transitory computer readable medium having stored thereon computer executable instructions, which when executed by one or more processors, cause the one or more processors to carry out operations to determine a left turn decision for a user driving a vehicle attempting to turn at an intersection of a road is disclosed. The operations include obtaining a plurality of contextual features and/or a plurality of sensor data related to the intersection of the road; determining a location on the road for the user to position the vehicle to make the left turn decision, based on the plurality of contextual features and/or a the plurality of sensor data; determining a left turn risk factor based on the location on the road for the user to position the vehicle; and alerting the user to the left turn risk factor with a left turn advisory message.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figure 1:
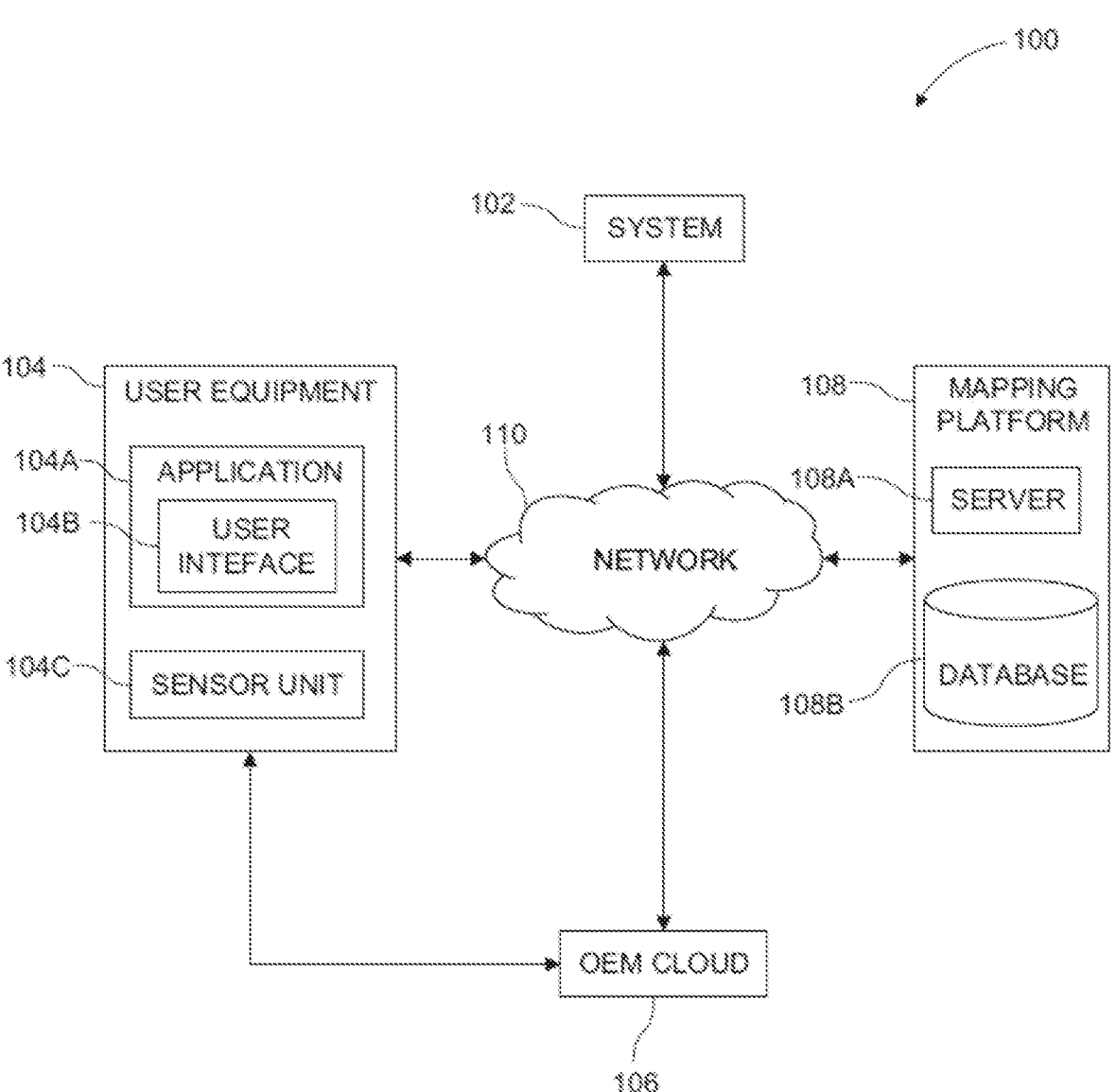
Figure 2:
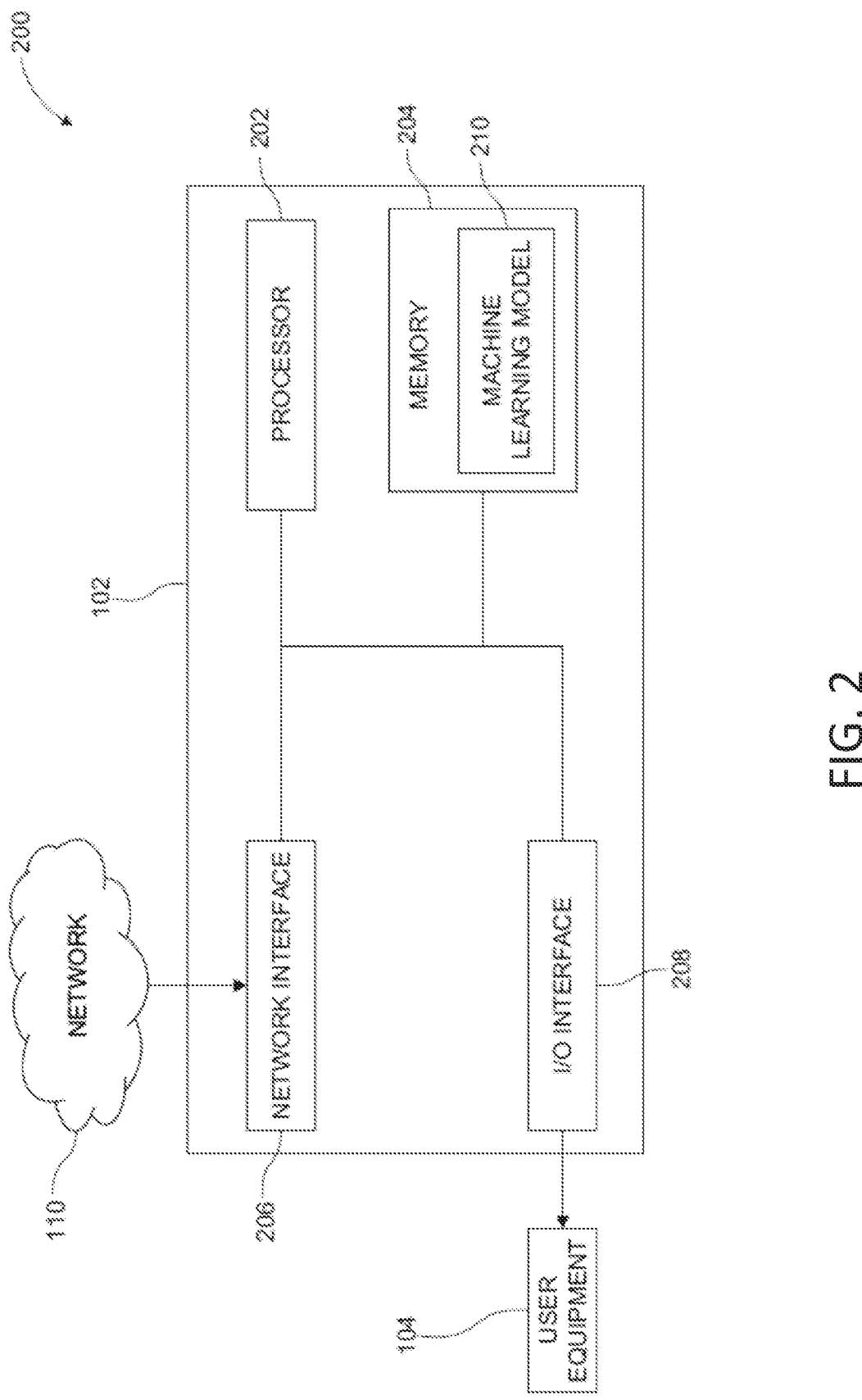
Figure 3:
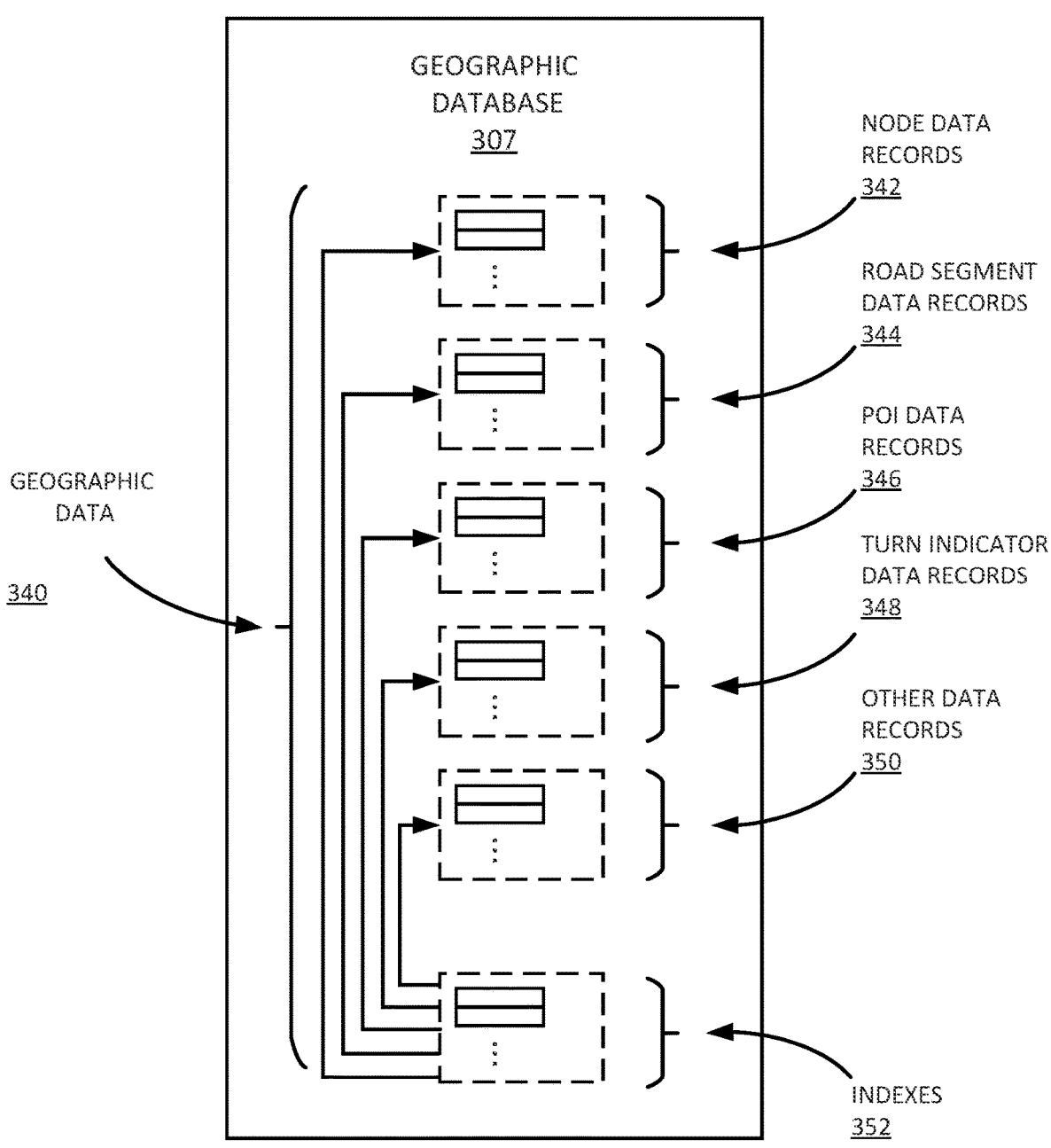
Figure 4:
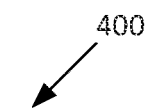
Figure 4:
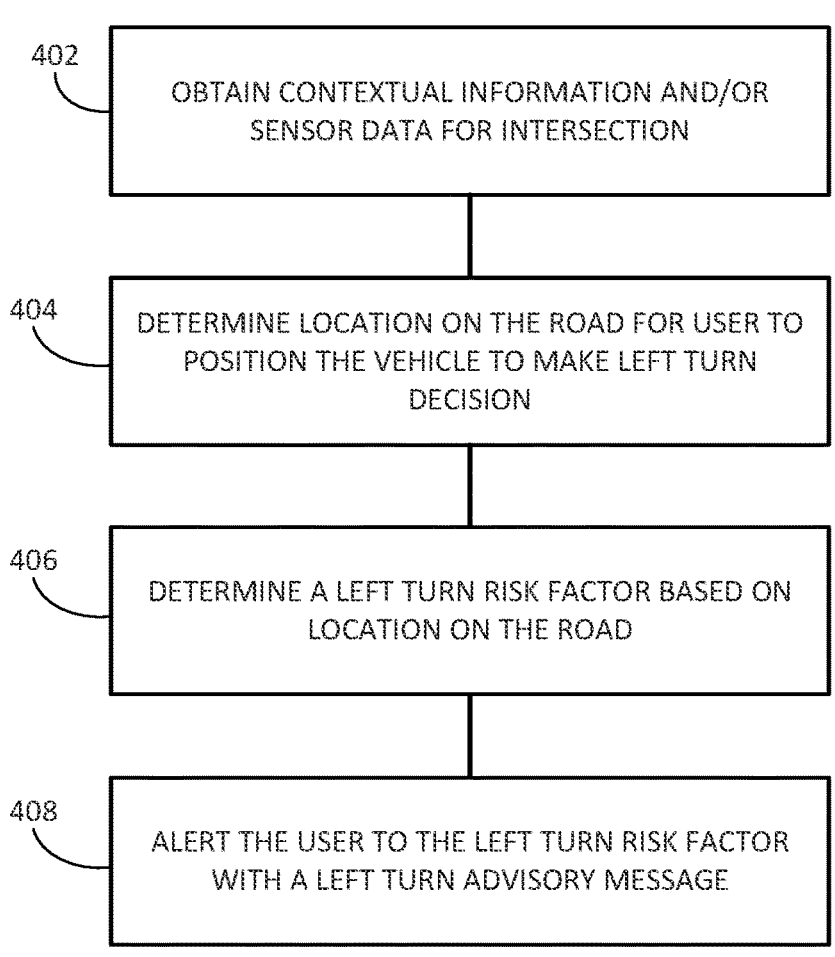
Figure 5:
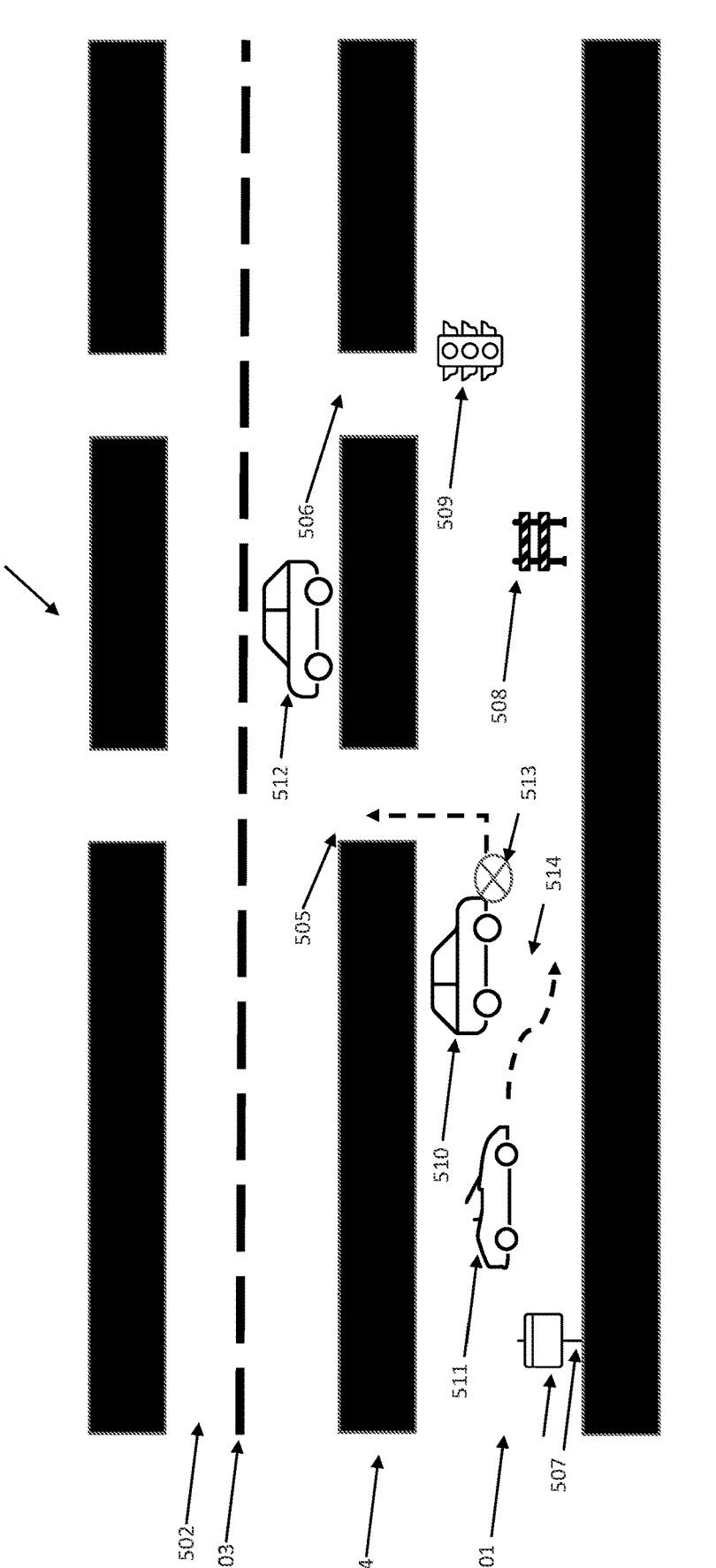

Having thus described certain aspects of the disclosure in general terms, reference will now be made to the accompanying drawings, which are not necessarily drawn to scale, and wherein:

FIG. 1 illustrates a schematic diagram of a network environment 100 of a system 102 for determining a left turn decision, according to an aspect of the disclosure;

FIG. 2 illustrates a block diagram of the system for determining a left turn decision at an intersection, according to an aspect of the disclosure;

FIG. 3 illustrates an example map or geographic database for use by the system for determining a left turn decision for a vehicle at an intersection, according to an aspect of the disclosure;

FIG. 4 illustrates a flowchart for acts taken in an exemplary method for determining a left turn decision at an intersection, according to an aspect of the disclosure; and FIG. 5 illustrates an example scenario for a vehicle attempting to take a left turn at an intersection, according to an aspect of the disclosure.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle ("AV") may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

For purposes of this disclosure, though not limiting or exhaustive, "transfer learning" refers to a technique in machine learning ("ML") that focuses on storing knowledge gained while solving one problem and applying it to a different but related problem, where transfer learning attempts to use a source domain of prior data from a different but related context and a prior target domain to generate a new target predictive function for the new data set being evaluated for the first time.

Left turns at intersections from major approaches (roads) to minor or cross streets can be very risky when visibility of on-coming vehicles is obstructed by queued opposing left-turning vehicles. This situation has been acknowledged as one of the most frequently occurring traffic conflict at intersections.

Accordingly, there is a need for assisting a driver or autonomous vehicle in a situation requiring a turn at an intersection, particularly for left turns, based on contextual information at the intersection and sensor data acquired by the vehicle.

The present disclosure addresses left turn decisions at potentially risky intersections, where other vehicles may attempt to pass the turning vehicle, which may lead to accidents themselves. The present disclosure provides identification of the intersections where such feature is needed/or helpful by determination of the exact location where to wait based on the vehicle's dimensions, detected contextual information of the situation around the intersection and the types of vehicles that need to go around the vehicle.

In an aspect of the disclosure, the disclosed system, method and computer program product provides left turn risk factor of waiting at this turn in the current context and sensed data at the intersection at which the driver desires to make a left turn. In an aspect, the present disclosure may present alternatives when the left turn risk factor too high, such as by suggesting taking next turn at a safer intersection with traffic lights.

In an aspect of the disclosure, user interfaces ("UI") may present where to exactly place the vehicle. Examples of UI alerts may include an audible alert, a visual alert, a vehicle console display alert, an in-vehicle infotainment ("IVI") alert, an augmented reality-based alert, a heads-up display alert, a haptic alert or a combination thereof.

In an aspect of the disclosure, the system may determine a left turn risk factor based on contextual features near the intersection, sensor data provided by internal, user and external sensors and an ML model. The ML model may leverage contextual features and sensor data to determine a location and estimated wait time at the location, to make a left turn safely. In an aspect, when a vehicle is arriving at an intersection not visited before or where contextual or sensor data is sparse or unavailable, the system may use transfer learning to assist the ML model in determining a left turn risk factor and location for the driver to proceed to and wait for when a left turn is possible.

FIG. 1 illustrates a schematic diagram of a network environment 100 of a system 102 for determining a left turn decision in accordance with an example aspect. The system 102 may be communicatively coupled with, a user equipment ("UE") 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment 104 includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for traffic features in a region of the intersection, that may be used to determine a driving decision based in part on sensor data. The system 102 may be communicatively coupled to the UE 104, the OEM cloud 106, and the mapping platform 108 directly via the network 110. Additionally, or alternately, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, an IVI system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via an OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for traffic features that may be used to determine a driving decision at the intersection. Further, in accordance with an aspect, the UE 104 may be configured to perform processing related to determine a location to assist the driver in making a left turn decision.

The UE 104 may include the application 104A with the user interface 104B to access one or more applications. The application 104A may correspond to, but not limited to, map related service application, navigation related service application and location-based service application. In other words, the UE 104 may include the application 104A with the user interface 104B.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, an ultrasonic detector, a proximity sensor, a weather sensor and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with a geographic area around and including an intersection where a turn may take place. The map data may include traffic features and include historical road layouts, such as pre-existing road networks, business, educational and recreational locations, POI locations, construction plans, lighting conditions, a time of day and a percentage or a number of successful turns and/or unsuccessful turns; a frequency of emergency stops at the intersection; a number of collisions due to a left turn at the intersection; a time of day when the vehicle is more likely to stop at the intersection; whether a shared vehicle is used in a certain time period and location; historical weather conditions at the intersection or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about road features to assist with a driving decision at an intersection. For example, real-time data may be collected for overall business activities at the intersection; a number of bicycle or small vehicle traffic in an area around the intersection; recent use of a shared vehicle in the area around the intersection; real-time weather conditions at the intersection; current visibility at the intersection; line-of-sight at the intersection; point-of-interest opening time around the intersection, etc. Other data records may include computer code instructions and/or algorithms for executing a trained machine learning model that is capable of providing assistance with determining a driving decision.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent pedestrian paths, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPV6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be or may be implemented on any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to determine a driving decision may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 2 illustrates a block diagram 200 of the system 102, exemplarily illustrated in FIG. 1, for determining a left turn for a vehicle at an intersection, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated with the one or more buildings for time duration. The sensor data may be captured by one or more UE, such as the UE 104. The processor 202 may be configured to determine mobility features associated with the one or more buildings, based on the sensor data. The processor 202 may be further configured to determine, using a trained machine learning model, a left turn decision based on a location to position the vehicle to make a left turn decision and/or a left turn risk factor, from contextual features and/or sensor data associated with the geographic area surrounding and including the intersection.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feedforward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing real time parking updates, big data analysis, and sensor-based data collection for providing navigation and parking recommendation services. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example, a GPS or GLNSS-based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102. In accordance with an aspect, the I/O interface 208 may be configured to output the left turn decision and/or alerts or warnings related to the left turn decision to a user device, such as, the UE 104 of FIG. 1.

In example aspects, the I/O interface 208 may be configured to provide the data associated with determined left turn decisions to the database 108A to update the map of a certain geographic region. In accordance with an aspect, a user requesting information in a geographic region may be updated about historical and real-time data related to traffic conditions, infrastructure, signage, traffic lights and signals, vehicle size and count, roads and potentially problematic turns in a geographic area. Other historical and/or real-time information related to geographic and contextual information of the areas includes one or more road dimensions, one or more intersection locations, one or more traffic signs along the road, one or more traffic lights near the intersection, street infrastructure near the intersection, lane demarcations on the road, one or more road crossing demarcations near the intersection, construction and roadwork information, a size of the vehicle, a size of a different vehicle near the vehicle, spatial dimensions available around the vehicle for the different vehicle to pass the vehicle, historical accident information near the intersection, satellite communications data, radio-frequency communications data, nearby unmanned autonomous vehicle information, weather data, driver preference information, map database information, online service information and the like. Examples of the input devices may include, but is not limited to, a touch screen, a keyboard, a mouse, a joystick, a microphone, and an image-capture device. Examples of the output devices may include, but is not limited to, a display, an IVI console, an AR display, heads-up display, a speaker, a haptic output device, or other sensory output devices.

In an aspect of the disclosure, the processor 202 may determine a location on the road for the user to position the vehicle to make the left turn decision, based on the plurality of contextual features and/or the plurality of sensor data. The location on the road for the user to position the vehicle to make the left turn decision may be determined by analyzing the plurality of contextual information and/or the plurality of sensor data to calculate an optimal location for the vehicle to be positioned so that the driver may execute a left turn safely. In an aspect, a weighted linear regression model may be used to determine the location on the road for the driver to position the vehicle to attempt a left turn. In another aspect, a look-up table for determining the location on the road to position the vehicle to make the left turn decision, where the look-up table is populated with entries of prior left turn decisions based on input factors.

In another aspect, a machine learning model, such as trained machine learning model 210 discussed earlier, may be used to determine the location on the road for the driver to position the vehicle for the left turn. In accordance with an aspect, the machine learning model 210 may be trained offline to obtain a classifier model to determine the left turn decision for a vehicle at an intersection based on contextual features and/or sensor data collected in a geographic region. For the training of the machine learning model 210, different feature selection techniques and classification techniques may be used. The system 102 may be configured to obtain the trained machine learning model 210 and determine a location to attempt a left turn from the contextual features and/or sensor data obtained from the one or more UE, such as the UE 104 for obtaining the contextual features in a geographic region surrounding and including the intersection that presents a left turn decision. In one aspect, supervised machine learning techniques may be utilized where ground truth data is used to train the model for different scenarios and then in areas where there is not sufficient ground truth data, the trained machine learning model 210 can be used to predict features or results.

In an aspect, the machine learning model may be complemented or substituted with a transfer learning model. The transfer learning model may be used when the plurality of contextual information and/or the plurality of sensor data for the location approached by the vehicle is unavailable, sparse, incomplete, corrupted or otherwise unreliable for determining the location on the road to make a left turn safely. The transfer learning model may then use contextual information and/or sensor data from other prior locations and left turns to assist in determining the location on the road for the user to position the vehicle to make a left turn decision. For example, if contextual information and/or sensor data from prior intersections and left turn attempts indicate that a smaller road with larger vehicles would indicate a certain location at a certain offset for the left turn decision, that set of information may be probative for determining the location on the road in the current situation the driver faces.

In an aspect, the location on the road may be determined by weighting contextual features, such as road dimensions, the driver's vehicle size (length and width), other vehicle sizes observed at the time of attempting the left turn, or historical information about vehicle sizes and counts for the area of the intersection. For example, on a wider road with small size vehicles of low count at the location and time of the attempted turn, the left turn decision may be determined to be a location that allows ample space for other vehicles to bypass the vehicle waiting to attempt a left turn, without endangering the driver's safety. In an aspect, accident data for the intersection area may be weighted higher in determining the optimal location for the left turn decision. In an aspect, higher accident data for the intersection may indicate a left turn decision such that the driver will be advised to position the vehicle to prevent other vehicles from passing the vehicle on the right. As each vehicle has different attributes and drivers have different preferences, the determined location to position the vehicle may be different for each vehicle coming to the same intersection, based on a contextually personalized location at which to wait. Additional contextual information may be considered, such as a situation where the system may not even need to determine an optimal location to let other vehicles pass if the next vehicle is a long and large truck which would not be able to pass in a given intersection under most circumstances.

In an aspect of the disclosure, the left turn risk factor may be determined by the contextual features at the intersection and/or sensor data collected at the intersection. An intersection with a higher accident rate, lower line-of-sight visibility, small road sizes and widths, large vehicle size and traffic count may all factor to determine a higher left turn risk factor. The system may estimate the left turn risk factor associated with leaving enough space voluntarily around the vehicle to let other vehicles pass. If historical contextual information indicates that accidents have occurred in similar contexts in the past as larger vehicles also attempted to pass but ended up hitting the vehicle, then the system may give a higher left turn risk factor and the system may recommend a conservative approach for the suggested location (i.e., reducing the left turn risk factor and not allowing much space for other vehicles to go around the vehicle).

In an aspect, a weighted linear regression model may be used to determine the left turn risk factor. In another aspect, a machine learning model, such as the trained machine learning model 210, may be used to determine the left turn risk factor based on the determined location to position the vehicle to make a left turn decision. In an aspect, the trained machine learning model 210 may be complemented or substituted with a transfer learning model. The transfer learning model may be used when the plurality of contextual information and/or the plurality of sensor data for the location approached by the vehicle is unavailable, sparse, incomplete, corrupted or otherwise unreliable for determining the left turn risk factor for the area around the intersection and the determined location to position the vehicle for a left turn decision. The transfer learning model may then use contextual information and/or sensor data from other prior locations and left turns to assist in determining the left turn risk factor. For example, if contextual information and/or sensor data from prior intersections and left turn attempts indicate that a smaller road with larger vehicles would indicate a certain location at a certain offset for the left turn decision, that set of information may be probative for determining the location on the road in the current situation the driver faces.

Datasets comprising the sensor data may be used for building the trained machine learning model 210 with all left turn decisions and left turn risk factors to be determined. For building the machine learning model 210, the sensor data may be obtained for fixed time duration, and a reference left turn decision or left turn risk factor may be assigned in the training data (such as, the sensor data) to learn from. Further, the contextual features that represent motion dynamics or stationarity may be determined, stored and fed to the machine learning model 210 building technique. Further, for building the machine learning model 210, the sensor data may be fed to the model building technique to run it to build and obtain the machine learning model 210. The left turn decision and/or left turn risk factor may be a target output used to build the machine learning model 210, and the contextual features that represent motion dynamics or stationarity constitute as input to the machine learning model 210 corresponding to the target output. In accordance with an aspect, the machine learning model building technique may correspond to a classification technique, such as, but not limited to, decision trees and random forest.

In accordance with an aspect, various data sources may provide the contextual features and/or sensor data as an input to the machine learning model 210. In accordance with an aspect, contextual features may be provided as an input to the machine learning model 210. Examples of the machine learning model 210 may include, but not limited to, Decision Tree (DT), Random Forest, and Ada Boost. In accordance with an aspect, the memory 204 may include processing instructions for training of the machine learning model 210 with data set that may be real-time (or near real time) data or historical data. In accordance with an aspect, the data may be obtained from one or more service providers.

FIG. 3 illustrates an example map or geographic database 307, which may include various types of geographic data 340. The geographic database 307 may be similar to or an example of the database 108B. The data 340 may include but is not limited to node data 342, road segment or link data 344, map object and point of interest (POI) data 346, turn indicator data records 348, or the like (e.g., other data records 350 such as traffic data, sidewalk data, road dimension data, building dimension data, vehicle dimension/turning radius data, etc.). Other data records may include computer code instructions and/or algorithms for executing a trained machine learning model that is capable of providing a left turn risk factor and left turn decision based on traffic features.

A profile of end user driving data (e.g., a driving profile) such as end user driving and turning patterns (e.g., hesitations/cautious, slow, fast, etc.) may be obtained by any functional manner including those detailed in U.S. Pat. Nos. 9,766,625 and 9,514,651, both of which are incorporated herein by reference. This data may be stored in one of more of the databases discussed above including as part of the turn indicator records 348 in some aspects. This data may also be stored elsewhere and supplied to the system 102 via any functional means.

In one aspect, the following terminology applies to the representation of geographic features in the geographic database 307. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of one or more personalized routes. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 307 may be maintained by a content provider, e.g., the map data service provider and may be accessed, for example, by the content or service provider processing server. By way of example, the map data service provider can collect geographic data and dynamic data to generate and enhance the map database and dynamic data such as traffic-related data contained therein.

There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The records for turn indicator data records 348 may include various points of data such as, but not limited to: road images, vehicle images, images of objects proximate to a vehicle, location and time/date information, height, weight, and data on other vehicles or objects present at the time when a left turn was detected, etc. End user driving profile data may also be included in the turn indicator data records 348 (or stored elsewhere). Driving profile data such as the driving capabilities, reaction time, typical turn duration, etc. may be included in some driving profiles.

FIG. 4 illustrates a flowchart 400 for acts taken in an exemplary method for determining a left turn decision for a user (which may be either a human or AV) driving a vehicle attempting to turn at an intersection of a road based on a plurality of contextual features and/or a plurality of sensor data in the geographic region around the intersection, in accordance with an aspect. FIG. 4 is explained in conjunction with FIG. 1 to FIG. 3. The control starts at act 402.

At act 402, a plurality of contextual features and/or a plurality of sensor data related to the intersection of the road may be obtained for a time duration. In an aspect, the processor 202 may be configured to obtain the plurality of contextual features including, but not limited to, one or more road dimensions, one or more intersection locations, one or more traffic signs along the road, one or more traffic lights near the intersection, street infrastructure near the intersection, lane demarcations on the road, one or more road crossing demarcations near the intersection, construction and roadwork information, a size of the vehicle, a size of a different vehicle near the vehicle, spatial dimensions available around the vehicle for the different vehicle to pass the vehicle, historical accident information near the intersection, satellite communications data, radio-frequency communications data, nearby unmanned autonomous vehicle information, weather data, driver preference information, map database information, online service information, etc.

In an aspect, the processor 202 may be configured to obtain the plurality of sensor data, including, but not limited to proximity sensor data, motion detection sensor data, accelerometer data, weather sensor data, positioning sensor data, external remote sensor data, etc. The sensor data may be obtained from one or more user equipment (UE). In an aspect of the disclosure, the UE may correspond to a mobile phone or an electronic device associated with the user or vehicle, such as an on-board vehicle computer, an IVI, smart phones, smart watches, smart wearable devices, tablets, laptop or notebook computers or other mobile devices. In an aspect, the UE may include sensors associated with devices external to the vehicle and the user, such as weather sensors, positioning beacons and sensors, satellite, cellular and wide-area-network-connected sensors, RFID sensors or other external remote sensor devices and UEs known to one of skill in the art for vehicle transportation and traffic information systems.

At act 404, a location on the road for the user or autonomous vehicle to position the vehicle to make the left turn decision, based on the plurality of contextual features and/or the plurality of sensor data is determined. The location on the road for the user to position the vehicle to make the left turn decision may be determined by analyzing the plurality of contextual information and/or the plurality of sensor data to calculate an optimal location for the vehicle to be positioned so that the driver may execute a left turn safely. In an aspect, a weighted linear regression model may be used to determine the location on the road for the driver to position the vehicle to attempt a left turn. In another aspect, a machine learning model, such as machine learning model 210 discussed earlier, may be used to determine the location on the road for the driver to position the vehicle for the left turn. In an aspect, the machine learning model may be complemented or substituted with a transfer learning model. The transfer learning model may be used when the plurality of contextual information and/or the plurality of sensor data for the location approached by the vehicle is unavailable, sparse, incomplete, corrupted or otherwise unreliable for determining the location on the road to make a left turn safely. The transfer learning model may then use contextual information and/or sensor data from other prior locations and left turns to assist in determining the location on the road for the user to position the vehicle to make a left turn decision. For example, if contextual information and/or sensor data from prior intersections and left turn attempts indicate that a smaller road with larger vehicles would indicate a certain location at a certain offset for the left turn decision, that set of information may be probative for determining the location on the road in the current situation the driver faces.

In an aspect, the location on the road may be determined by weighting contextual features, such as road dimensions, the driver's vehicle size (length and width), other vehicle sizes observed at the time of attempting the left turn, or historical information about vehicle sizes and counts for the area of the intersection. For example, on a wider road with small size vehicles of low count at the location and time of the attempted turn, the left turn decision may be determined to be a location that allows ample space, which may be determined by distance thresholding based on vehicle dimensions and road dimensions, for other vehicles to bypass the vehicle waiting to attempt a left turn, without endangering the driver's safety. In an aspect, accident data for the intersection area may be weighted higher in determining the optimal location for the left turn decision. In an aspect, higher accident data for the intersection may indicate a left turn decision such that the driver will be advised to position the vehicle to prevent other vehicles from passing the vehicle on the right. As each vehicle has different attributes and drivers have different preferences, the determined location to position the vehicle may be different for each vehicle coming to the same intersection, based on a contextually personalized location at which to wait. Additional contextual information may be considered, such as a situation where the system may not even need to determine an optimal location to let other vehicles pass if the next vehicle is a long and large truck which would not be able to pass in a given intersection under most circumstances.

In an aspect, an estimated wait time for the driver to make a left turn at the location may be determined. The estimated wait time may depend on some of the same factors as used to determine the location for the left turn, such as number, size, speed of other vehicles on the road near the vehicle attempting to turn at the intersection. Other factors such as driver preferences, weather information, construction/roadwork information and other factors may influence the determination of the estimated weight time.

In an aspect of the disclosure, the driver may be alerted to the determined location on the road by alerts or prompts or instructions to direct the driver to the determined location. In an aspect, the alerts or prompts may include instructing the user of the location on the road with an audible alert, a visual alert, a vehicle console display alert, an augmented reality-based alert, a heads-up display alert, a haptic alert (such as a vibration on the steering wheel), IVI displays and sounds, etc. In addition, other sensors can be leveraged, such as LiDAR, radar or proximity sensors to precisely guide the user to the "virtual" location on the road. In an aspect, audio cues can be used as well as if the user were to enter a parking spot, beeping increasingly when approaching the virtual limits. In an aspect, the user could also decide to let the vehicle get to this exact location on its own, autonomously, if it has the necessary sensors. In an aspect, the frequency, duration, volume, brightness or other indicia of the alert directed to the driver may increase as the vehicle approaches closer to the determined location.

At act 406, a left turn risk factor based on the location on the road for the user or autonomous vehicle to position the vehicle may be determined. The left turn risk factor may be determined by the contextual information at the intersection and/or sensor data collected at the intersection. An intersection with a higher accident rate, lower line-of-sight visibility, small road sizes and widths, large vehicle size and traffic count may all factor to determine a higher left turn risk factor. The system may estimate the left turn risk factor associated with leaving enough space voluntarily around the vehicle to let other vehicles pass. If historical contextual information indicates that accidents have occurred in similar contexts in the past as larger vehicles also attempted to pass but ended up hitting the vehicle, then the system may give a higher left turn risk factor and the system may recommend a conservative approach for the suggested location (i.e., reducing the left turn risk factor and not allowing much space for other vehicles to go around the vehicle).

In an aspect, a weighted linear regression model may be used to determine the left turn risk factor. In another aspect, a machine learning model, such as machine learning model 210 discussed earlier, may be used to determine the left turn risk factor based on the determined location to position the vehicle to make a left turn decision. In an aspect, the machine learning model may be complemented or substituted with a transfer learning model. The transfer learning model may be used when the plurality of contextual information and/or the plurality of sensor data for the location approached by the vehicle is unavailable, sparse, incomplete, corrupted or otherwise unreliable for determining the left turn risk factor for the area around the intersection and the determined location to position the vehicle for a left turn decision. The transfer learning model may then use contextual information and/or sensor data from other prior locations and left turns to assist in determining the left turn risk factor. For example, if contextual information and/or sensor data from prior intersections and left turn attempts indicate that a smaller road with larger vehicles would indicate a certain location at a certain offset for the left turn decision, that set of information may be probative for determining the location on the road in the current situation the driver faces.

At act 408, the user operator or autonomous vehicle is alerted to the left turn risk factor with a left turn advisory message. In an aspect, the left turn advisory message may be a presentation of alternative routes when the left turn risk factor is above a threshold, i.e., too high, and the left turn advisory message may suggest taking a next turn at a safer intersection with traffic lights. Instructions to an autonomous vehicle may be accepted automatically based on preferences, or passengers may have the option via a selection screen on the UE 104 to choose to take the alternative route when presented In another aspect, when the determined left turn risk factor is above a threshold, the left turn advisory message may include a different route guidance for human driven or autonomous vehicle to reduce the hazard at the upcoming intersection for a left turn decision.

FIG. 5 illustrates an example scenario for a vehicle attempting to take a left turn at an intersection, according to an aspect of the disclosure. In a schematic view of an aspect, a road 500 may present a first lane 501 and a second lane 502, upon which vehicles may travel. The first lane 501 is illustrated here as a one-way road, but other directions of traffic may be applicable. The second lane 502 is illustrated here as a two-direction road with a lane divider demarcation 503 illustrated as a dotted line painted on the second lane 502. A median 504 may be present as well, separating the first lane 501 from the second lane 502. A first intersection 505 and a second intersection 506 may be present. Other traffic indicators and control signs may be present, such as road signage 507, construction/roadwork signage 508 and a traffic signal 509.

A first vehicle 510, illustrated here as a sedan may be driving along the first lane 501, and anticipating making a left turn at the intersection 505. A second vehicle 511, illustrated in FIG. 5 as a convertible, may be traveling along the same first lane 501, following behind the first vehicle 510. A third vehicle 512, illustrated in FIG. 5 as a sedan, may be traveling on second lane 502 in an opposite direction to the first vehicle 510.

As the first vehicle 510 approaches the first intersection, the disclosed system to determine a left turn decision for a user driving a vehicle attempting to turn at an intersection of a road will obtain a plurality of context features for the area surrounding the first intersection 505 and the second intersection 506 on the road and/or sensor data available for the area surrounding the first intersection 505 and the second intersection 506 on the road. The vehicle 510 may obtain contextual features such as a size of vehicle 510 (width and length), a size of the second vehicle 511 (width and length), dimensions of the first lane 501, a presence and a size of road infrastructure, such as curbs, drainage, bicycle or pedestrian lane, road signage 507, construction/roadwork signage 508, traffic signals 509 and other contextual features that may be pertinent to determining the left turn decision for the vehicle 510. The system may obtain sensor data such position data, weather data, motion detection data for other vehicles (511, 512), bicycles and/or pedestrians, accelerometer data or other pertinent sensor data for making a left turn decision at the first intersection 505. The contextual features and/or the sensor data may be obtained from a UE within the first vehicle 510 or may be obtained from sources outside the first vehicle 510, such as remote UEs, online map databases and online services, RF signals from traffic beacons, etc. The system 102 may determine a location 513 at which the user of the vehicle is instructed to approach to make a left turn decision at the first intersection 505 based on the contextual features and/or sensor data, to determine an optimal location to position the first vehicle 510 to make a left turn safely.

In an aspect, the system 102 may determine a left turn decision that accounts for the presence, size, length and width of the second vehicle 511, to consider positioning the first vehicle at a location 513 so that the second vehicle 511 may pass safely around the first vehicle 510 while waiting to make a left turn safely. In an aspect, the system may consider accident information associated with the area of the first intersection 505 to determine that the risk of accident is high when vehicles pass around other vehicles near the first intersection 505, and thus the first vehicle 510 may be instructed to position at location 513 to prevent the second vehicle 511 from passing around the first vehicle 505 into region 514 illustrated in FIG. 5. In an aspect, the system may also determine an estimated wait time at the first intersection 505 before a left turn is possible.

In an aspect, the system may guide the user of the first vehicle 510 to the location 510 by prompts, alerts or instructions on how to approach the location 513. The system may provide an audible alert, a visual alert, a vehicle console display alert, an augmented reality-based alert, a heads-up display alert, a haptic alert (vibration of steering wheel), etc. to alert the user and instruct the user on navigating as precisely as possible to the location 513.

In an aspect, as the first vehicle 510 is approaching the location 513 to make a left turn decision, the system 102 may determine a left turn risk factor based on the location 513, along with contextual features and/or sensor data obtained for the area around the first intersection 505. The system may weigh certain contextual features and/or sensor data as more important to evaluating the risk and hazard associated with staying at the location 513, such as higher accident rates at the first intersection 505, presence or lack of presence of traffic signage 507, roadwork/construction signage 508 and/or traffic signals 509, etc. and determine a higher left turn risk factor if adverse contextual features and/or sensor data are present. The system may weigh contextual features such as the size and length of nearby vehicles, presence of large trucks or other large vehicles on the first lane 501 at this geographic area and/or time of day, historical and ambient weather conditions as more important to evaluating the risk or hazard of staying at the location 513 to wait for a left turn, resulting in a higher left turn risk factor if adverse contextual features and/or sensor data are present.

In an aspect, the system 102 may alert the user of the first vehicle 510 of the left turn risk factor presence and magnitude by a left turn advisory message presented to the user. The left turn advisory message may be an audible alert, a visual alert, a vehicle console display alert, an augmented reality-based alert, a heads-up display alert, a haptic alert (vibration of steering wheel), etc. The left turn advisory message may be a coloration of a map displayed on an IVI of the first vehicle 510, such as a red-colored area on the map to indicate a high left turn risk factor or a green-colored area on the map to indicate a low left turn risk factor.

In an aspect, the system 102 may, based on the left turn risk factor, instruct the user or AV to re-route to another intersection, such as the second intersection 506, which may be safer and have a lower left turn risk factor due to the presence of traffic signals 509, for example.

Blocks of the flowchart 400 support combinations of means for performing the specified functions and combinations of operations for performing the specified functions. It will also be understood that one or more blocks of the flowchart 400, and combinations of blocks in the flowchart 400, can be implemented by special purpose hardware-based computer systems which perform the specified functions, or combinations of special purpose hardware and computer instructions. Also, more, fewer or different steps may be provided.

Alternatively, the system 102 may comprise means for performing each of the operations described above. In this regard, according to an example aspect, examples of means for performing operations may comprise, for example, the processor 202 and/or a device or circuit for executing instructions or executing an algorithm for processing information as described above.

In an aspect of the disclosure, the disclosed system, method and computer program product to determine a left turn decision for a user in a vehicle attempting to turn at an intersection may allow a user to be more courteous to other vehicles when possible to do so safely by allowing the other vehicle to pass while the user is waiting to make a left turn. In an aspect of the disclosure, the disclosed system, method and computer program product may reduce traffic congestion and delays along the road. In an aspect of the disclosure, the disclosed system, method and computer program product may lower stress levels of other drivers behind the vehicle, possibly reducing the incidence of road rage or collisions with other vehicles. In an aspect of the disclosure, the disclosed system, method and computer program product, leaving enough space for cars to pass may sometimes the best way to avoid that a vehicle tries to pass without the risk of touching the turning vehicle by providing enough space for a safe passage of the vehicle behind the user.

Although the aforesaid description of FIGS. 1-5 is provided with reference to the sensor data, however, it may be understood that the disclosure would work in a similar manner for different types and sets of data as well. The system 102 may generate/train the machine learning model 210 to evaluate different sets of data at various geographic locations. Additionally, or optionally, the determined location on the road for the user to position the vehicle to make the left turn decision in the form of output data may be provided to an end user, as an update which may be downloaded from the mapping platform 110. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an aspect of the present disclosure and executed by the processing circuitry. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system to determine a left turn decision for a user driving a vehicle attempting to turn at an intersection of a road, the system comprising:

at least one memory configured to store computer executable instructions; and at least one processor configured to execute the computer executable instructions to:

obtain a plurality of contextual features and a plurality of sensor data related to the intersection of the road, wherein the plurality of contextual features and the plurality of sensor data related to the intersection of the road includes vehicle dimensions of a user's vehicle and one or more dimensions of one or more vehicles proximate to the intersection;

determine a location on the road for the user to position the vehicle to make the left turn decision, based on the plurality of contextual features and the plurality of sensor data, wherein the location provides a predetermined spatial clearance around the user's vehicle sufficient for the one or more vehicles proximate to the intersection to pass the user's vehicle while the user waits to perform a left turn;

determine a left turn risk factor for the location on the road for the user to position the vehicle using a trained machine learning model to determine the location on the road and the left turn risk factor; and alert the user to the left turn risk factor with a left turn advisory message, where the left turn advisory message comprises an estimated wait time at the location on the road before a left turn is possible, where the estimated wait time is based on the left turn risk factor.

2. The system of claim 1, where the computer executable instructions to alert the user to the left turn risk factor with the left turn advisory message comprise computer executable instructions to re-route the user, if the left turn risk factor exceeds a risk threshold, to a different intersection.

3. The system of claim 1, where the computer executable instructions to determine a location on the road further comprises the computer executable instructions to instruct the user of the location on the road with an audible alert, a visual alert, a vehicle console display alert, an augmented reality-based alert, a heads-up display alert, a haptic alert or a combination thereof.

4. The system of claim 1, where the plurality of contextual features comprise one or more road dimensions, one or more intersection locations, one or more traffic signs along the road, one or more traffic lights near the intersection, street infrastructure near the intersection, lane demarcations on the road, one or more road crossing demarcations near the intersection, construction and roadwork information, a size of the vehicle, a size of a different vehicle near the vehicle, spatial dimensions available around the vehicle for the different vehicle to pass the vehicle, historical accident information near the intersection, satellite communications data, radio-frequency communications data, nearby unmanned autonomous vehicle information, weather data, driver preference information, map database information, online service information or a combination thereof.

5. The system of claim 1, where the plurality of sensor data comprises proximity sensor data, motion detection sensor data, accelerometer data, weather sensor data, positioning sensor data, external remote sensor data or a combination thereof.

6. The system of claim 1, where the computer executable instructions to use the trained machine learning model comprises computer executable instructions to use a transfer learning model based on a plurality of prior contextual features.

7. A method for determining a left turn decision for a vehicle attempting to turn at an intersection of a road, the method comprising:

obtaining a plurality of contextual features and a plurality of sensor data related to the intersection of the road, wherein the plurality of contextual features and the plurality of sensor data related to the intersection of the road includes vehicle dimensions of a user's vehicle and one or more dimensions of one or more vehicles proximate to the intersection;

determining a location on the road for the vehicle to make the left turn decision, based on the plurality of contextual features and the plurality of sensor data, wherein the location provides a predetermined spatial clearance around the user's vehicle sufficient for the one or more vehicles proximate to the intersection to pass the user's vehicle while the user waits to perform a left turn;

determining a left turn risk factor for the location on the road for the user to position the vehicle using a trained machine learning model to determine the location on the road and the left turn risk factor; and notifying the vehicle to the left turn risk factor with a left turn advisory message, where the left turn advisory message comprises an estimated wait time at the location on the road before a left turn is possible, where the estimated wait time is based on the left turn risk factor.

8. The method of claim 7, where alerting the vehicle to the left turn risk factor with the left turn advisory message comprises re-routing the vehicle, if the left turn risk factor exceeds a risk threshold, to a different intersection.

9. The method of claim 7, where determining the location on the road further comprises instructing the vehicle of the location on the road with an audible alert, a visual alert, a vehicle console display alert, an augmented reality-based alert, a heads-up display alert, a haptic alert or a combination thereof.

10. The method of claim 7, where the plurality of contextual features comprise one or more road dimensions, one or more intersection locations, one or more traffic signs along the road, one or more traffic lights near the intersection, street infrastructure near the intersection, lane demarcations on the road, one or more road crossing demarcations near the intersection, construction and roadwork information, a size of the vehicle, a size of a different vehicle near the vehicle, spatial dimensions available around the vehicle for the different vehicle to pass the vehicle, historical accident information near the intersection, satellite communications data, radio-frequency communications data, nearby unmanned autonomous vehicle information, weather data, driver preference information, map database information, online service information or a combination thereof.

11. The method of claim 7, where the plurality of sensor data comprises proximity sensor data, motion detection sensor data, accelerometer data, weather sensor data, positioning sensor data, external remote sensor data or a combination thereof.

12. The method of claim 7, where determining the location on the road comprises determining a location on the road to prevent a collision with a passing vehicle.

13. A computer program product comprising a non-transitory computer readable medium having stored thereon computer executable instructions, which when executed by one or more processors, cause the one or more processors to carry out operations to determine a left turn decision for a user driving a vehicle attempting to turn at an intersection of a road, the operations comprising:

obtaining a plurality of contextual features and a plurality of sensor data related to the intersection of the road, wherein the plurality of contextual features and the plurality of sensor data related to the intersection of the road includes vehicle dimensions of a user's vehicle and one or more dimensions of one or more vehicles proximate to the intersection;

determining a location on the road for the user to position the vehicle to make the left turn decision, based on the plurality of contextual features and/or the plurality of sensor data, wherein the location provides a predetermined spatial clearance around the user's vehicle sufficient for the one or more vehicles proximate to the intersection to pass the user's vehicle while the user waits to perform a left turn;

determining a left turn risk factor for the location on the road for the user to position the vehicle using a trained machine learning model to determine the location on the road and the left turn risk factor; and alerting the user to the left turn risk factor with a left turn advisory message, where the left turn advisory message comprises an estimated wait time at the location on the road before a left turn is possible, where the estimated wait time is based on the left turn risk factor.

14. The computer program product of claim 13, where determining the location on the road further comprises instructing the user of the location on the road with an audible alert, a visual alert, a vehicle console display alert, an augmented reality-based alert, a heads-up display alert, a haptic alert or a combination thereof.

15. The computer program product of claim 13, where the plurality of contextual features comprise one or more road dimensions, one or more intersection locations, one or more traffic signs along the road, one or more traffic lights near the intersection, street infrastructure near the intersection, lane demarcations on the road, one or more road crossing demarcations near the intersection, construction and roadwork information, a size of the vehicle, a size of a different vehicle near the vehicle, spatial dimensions available around the vehicle for the different vehicle to pass the vehicle, historical accident information near the intersection, satellite communications data, radio-frequency communications data, nearby unmanned autonomous vehicle information, weather data, driver preference information, map database information, online service information or a combination thereof.

16. The computer program product of claim 13, where the plurality of sensor data comprises proximity sensor data, motion detection sensor data, accelerometer data, weather sensor data, positioning sensor data, external remote sensor data or a combination thereof.

* * * * *